United States Patent
Muramatsu

(12) 
(10) Patent No.: US 6,381,203 B1
(45) Date of Patent: Apr. 30, 2002

(54) OPTICAL DISK REPRODUCING METHOD AND APPARATUS

(75) Inventor: Akihiro Muramatsu, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/678,625

(22) Filed: Oct. 3, 2000

(30) Foreign Application Priority Data

Oct. 5, 1999 (JP) .......................................... 11-283776

(51) Int. Cl.$^7$ ................................................ G11B 7/00
(52) U.S. Cl. .................. 369/47.17; 369/53.1; 369/53.18
(58) Field of Search .......................... 369/47.1, 47.11, 369/47.17, 47.18, 47.44, 47.55, 53.1, 53.11, 53.12, 53.18, 53.2, 53.32, 53.41, 53.45, 59.1

(56) References Cited

U.S. PATENT DOCUMENTS 5,872,763 A * 2/1999 Osakabe .................. 369/47.53
6,240,060 B1 * 5/2001 Kikitsu et al. ........... 369/275.1

* cited by examiner

Primary Examiner—Muhammad Edun
(74) Attorney, Agent, or Firm—Morrison & Foerster

(57) ABSTRACT

Optical pickup is provided which includes a first reproduction channel for reproducing a first-type optical disk and a second reproduction channel for reproducing a second-type optical disk. When reproduction is to be performed on a third-type optical disk that is different from the first-type and second-type optical disks but reproducible via each of the first and second reproduction channels, the third-type optical disk is first test-reproduced both via the first reproduction channel and via the second reproduction channel, to thereby detect a jitter value of the information reproduced via the first reproduction channel and a jitter value of the information reproduced via the second reproduction channel. Then, the recorded information of the third-type optical disk is reproduced using one of the first and second reproduction channels that attains the jitter value closer to a predetermined target jitter value.

7 Claims, 4 Drawing Sheets

OPTICAL DISK REPRODUCING METHOD AND APPARATUS

BACKGROUND OF THE INVENTION

The present invention relates to an optical disk reproducing method and apparatus which are suitable for use with an optical pickup having a first reproduction channel for reproducing recorded information from a first-type optical disk and a second reproduction channel for reproducing recorded information from a second-type optical disk and which provides for high-quality reproduction of recorded information from a third-type optical disk that is reproducible via each of the first and second reproduction channels.

Generally, in DVD (Digital Versatile Disk) players, the optical pickup is equipped with a DVD reproduction channel and CD (Compact Disk) reproduction channel so that DVDs are reproduced via the DVD reproduction channel and CDs are reproduced via the CD reproduction channel.

As optical disks for communication karaoke with background pictures recorded thereon or optical disks for game software, there have been used high-density CDs that are characterized by a higher recording density than that of normal CDs so as to provide a total program-recording time length of 100 min. or over. Information recorded on such high-density CDs can be played back or reproduced by a DVD reproduction channel as well as a CD reproduction channel. Discussion is made below as to which of the DVD and CD reproduction channels can be used more advantageously for reproduction of the high-density CDs. The CD reproduction channel is designed as follows to match physical characteristics of the CD (i.e., normal CD) such as a substrate thickness of 1.2 mm, track pitch of 1.6 $\mu$m and linear velocity of 1.2 –1.4 m/sec.

|  | Laser Wavelength (nm) | NA of Objective Lens |
| --- | --- | --- |
| Example 1 | 780 | 0.45 |
| Example 2 | 635 or 650 | 0.37 |

The DVD reproduction channel, on the other hand, is designed as follows to match physical characteristics of the DVD such as a substrate thickness of 0.6 mm, track pitch of 0.74 $\mu$m and linear velocity of 3.49 m/sec. in the case of the single-layered DVD.

| Laser Wavelength (nm) | NA of Objective Lens |
| --- | --- |
| 635 or 650 | 0.6 |

The high-density CD has physical characteristics somewhat different from those of the normal CD; for example, the high-density CD has a substrate thickness of 1.2 mm, track pitch of 1.3 $\mu$m and linear velocity of 0.9 m/sec. If such a high-density CD is reproduced by the CD reproduction channel, high-frequency components (particularly, 3T signals) of reproduced RF signals would be decreased in amplitude, thus deteriorating jitter characteristics. Because such reproduced RF signals can not be put to practical use as they are, it is necessary to amplify each 3T signal by equalizing the signal waveform by use of a transversal filter or the like, in which case, however, noise components would also be amplified to no small degree. But, the CD reproduction channel is advantageous in that it can be more tolerant of (or less susceptible to) a disk's warp by virtue of its small NA (Numerical Aperture) and is also less susceptible to defects on the disk surface by virtue of its large beam spot diameter. If, on the other hand, the high-density CD is reproduced by the DVD reproduction channel, then there would occur no decrease in the amplitude of the 3T signals; however, the DVD reproduction channel presents the disadvantage that it is susceptible to a disk's warp due to its large NA and is also susceptible to defects on the disk surface due to its small beam spot diameter.

SUMMARY OF THE INVENTION

It is therefore an object of the present invention to provide an optical disk reproducing method and apparatus which are suitable for use in reproduction of recorded information via an optical pickup that includes first and second reproduction channels for reproducing recorded information from first-type and second-type optical disks and is also capable of reproducing recorded information from a third-type optical disk via each of the first and second reproduction channels, just like the one including DVD and CD reproduction channels and capable of reproducing a high-density CD, and which provides for high-quality reproduction of the recorded information from the third-type optical disk.

Warp, surface defects etc. of an optical disk would appear as undesired jitters in RF signals reproduced from the optical disk. Thus, the present invention is characterized by, when reproducing recorded information from a third-type optical disk (other than first-type and second-type optical disks), first test-reproducing the third-type optical disk both via a first reproduction channel and via a second reproduction channel to thereby respectively detect jitter values of the information reproduced via the first and second reproduction channels and then reproducing the recorded information from the third-type optical disk using one of the first and second reproduction channels which attains the jitter value closer to a predetermined target jitter value.

More specifically, the present invention provides an improved optical disk reproducing method which comprises: a step of providing an optical pickup including a first reproduction channel for reproducing recorded information from a first-type optical disk and a second reproduction channel for reproducing recorded information from a second-type optical disk; and a step of, when recorded information is to be reproduced from a third-type optical disk that is different from the first-type optical disk and the second-type optical disk but reproducible via each of the first and second reproduction channels, test-reproducing the recorded information from the third-type optical disk both via the first reproduction channel and via the second reproduction channel to thereby detect a jitter value of the information reproduced via the first reproduction channel and a jitter value of the information reproduced via the second reproduction channel, and then reproducing the recorded information from the third-type optical disk using one of the first and second reproduction channels that attains the jitter value closer to a predetermined target jitter value. Because the above arrangement allows the third-type optical disk to be reproduced via the reproduction channel capable of attaining better jitter characteristics (i.e., jitter value closer to the target jitter value), the present invention always provides for high-quality reproduction of the third-type optical disk irrespective of the condition of the disk.

For example, the first-type optical disk is a DVD and the second-type optical disk is a normal CD, and the first reproduction channel is a DVD reproduction channel and the. second reproduction channel is a CD reproduction channel. Where the third-type optical disk is a high-density CD of the CD recording format which has a higher recording density than that of the normal CD so as to provide a total program-recording time length of 100 min. or over, the third-type optical disk is reproduced via the first or DVD reproduction channel if the better jitter characteristics are attained by the DVD reproduction channel. Similarly, if the better jitter characteristics are attained by the second or CD reproduction channel, then the third-type optical disk is reproduced via the CD reproduction channel. With this arrangement, the present invention always provides for high-quality reproduction of the third-type optical disk irrespective of the condition of the disk.

The present invention also provides an improved optical disk reproducing apparatus which comprises: an optical pickup including a first reproduction channel for reproducing recorded information from a first-type optical disk and a second reproduction channel for reproducing recorded information from a second-type optical disk; a jitter detection section that detects a jitter value of a reproduced RF signal outputted by the first reproduction channel and a jitter value of a reproduced RF signal outputted by the second reproduction channel; and a control section that switches between the first reproduction channel and the second reproduction channel, depending on a type of the optical disk to be reproduced and detected jitter values, in such a manner that the first reproduction channel is used when the recorded information is to be reproduced from the first-type optical disk and the second reproduction channel is used when the recorded information is to be reproduced from the second-type optical disk and also that when recorded information is to be reproduced from a third-type optical disk that is different from the first-type and second-type optical disks but reproducible via each of the first and second reproduction channels, the recorded information is first test-reproduced from the third-type optical disk both via the first reproduction channel and via the second reproduction channel to thereby detect a jitter value of the information reproduced via the first reproduction channel and a jitter value of the information reproduced via the second reproduction channel and then the recorded information is reproduced from the third-type optical disk using one of the first and second reproduction channels that attains the jitter value closer to a predetermined target jitter value.

In a preferred implementation, the optical disk reproducing apparatus further comprises: a waveform equalization section that performs a waveform equalization process on the reproduced RF signals; a waveform-equalization-characteristic adjustment section that adjusts a waveform equalization characteristic of the waveform equalization section, so as to optimize the jitter values detected by the jitter detection section for the reproduced RF signals having been subjected to the waveform equalization process; and a determination section that, when the recorded information is to be reproduced from the third-type optical disk, compares the jitter value of the third-type optical disk test-reproduced using the first reproduction channel and optimized via the waveform-equalization-characteristic adjustment section and the jitter value of the third-type optical disk test-reproduced using the second reproduction channel and optimized via the waveform-equalization-characteristic adjustment section and makes a determination as to which of the first and second reproduction channels attains the jitter value closer to the predetermined target jitter value. In this case, the control section switches the reproduction channel to be used for reproduction of the recorded information from the third-type optical disk, on the basis of a result of the determination.

The optical disk reproducing apparatus may further comprise a disk type identification section that identifies a type of the optical disk having been set in or loaded into the optical disk reproducing apparatus. In this case, the control section controls the switching of the reproduction channel to be used for reproduction of the third-type optical disk, on the basis of the type of the optical disk identified by the disk type identification section.

In the optical disk reproducing apparatus as well, the first-type optical disk optical disk is a DVD and the second-type is a normal CD, and the first reproduction channel is a DVD reproduction channel and the second reproduction channel is a CD reproduction channel. Where the third-type optical disk is a high-density CD of the CD recording format which has a higher recording density than that of the normal CD so as to provide a total program-recording time length of 100 min. or over, the disk type identification section identifies the optical disk as a normal CD if the total program-recording time length represented by the Q subcode information in the lead-in area of the optical disk is less than 100 min., but identifies the optical disk as a high-density CD if the total program-recording time length represented by the Q subcode information in the lead-in area of the optical disk is 100 min. or over.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

Now, preferred embodiments of the present invention will be described in relation to a case where a first-type optical disk is a DVD, a second-type optical disk is a CD and a third-type optical disk is a high-density CD and where a first reproduction channel is a DVD reproduction channel and a second-type reproduction channel is a CD reproduction channel. First, a brief description will be given about the structure of the high-density CD. The high-density CD is a playback-only optical disk, which has the same outer and inner diameters (12 cm and 1.5 cm) and substrate thickness (1.2 mm) as the normal CD. Just like the normal CD, the information recording section of the high-density CD is divided into an innermost lead-in area, intermediate program area and outermost lead-out area, and information is recorded on the high-density CD in the CD format. Q subcode in the lead-in area has recorded therein a TOC (Table Of Contents) regarding tracks recorded in the program area. The TOC contains information indicative of respective start times of the individual tracks, start time of the lead-out area, etc. Difference between the start time of the first track and the start time of the lead-out area is equal to a total program-recording time length of the optical disk. While the maximum program-recording time length of the normal CD is 74 min. 59 sec. and 74 frames, the maximum program-recording time length of the high-density CD is 100 min. or over; in a situation where the actual total program-recording time length is shorter than 100 min., it is normally adjusted to be 100 min. or over by recording a 0 or 0s onto the last track.

Figure 2:
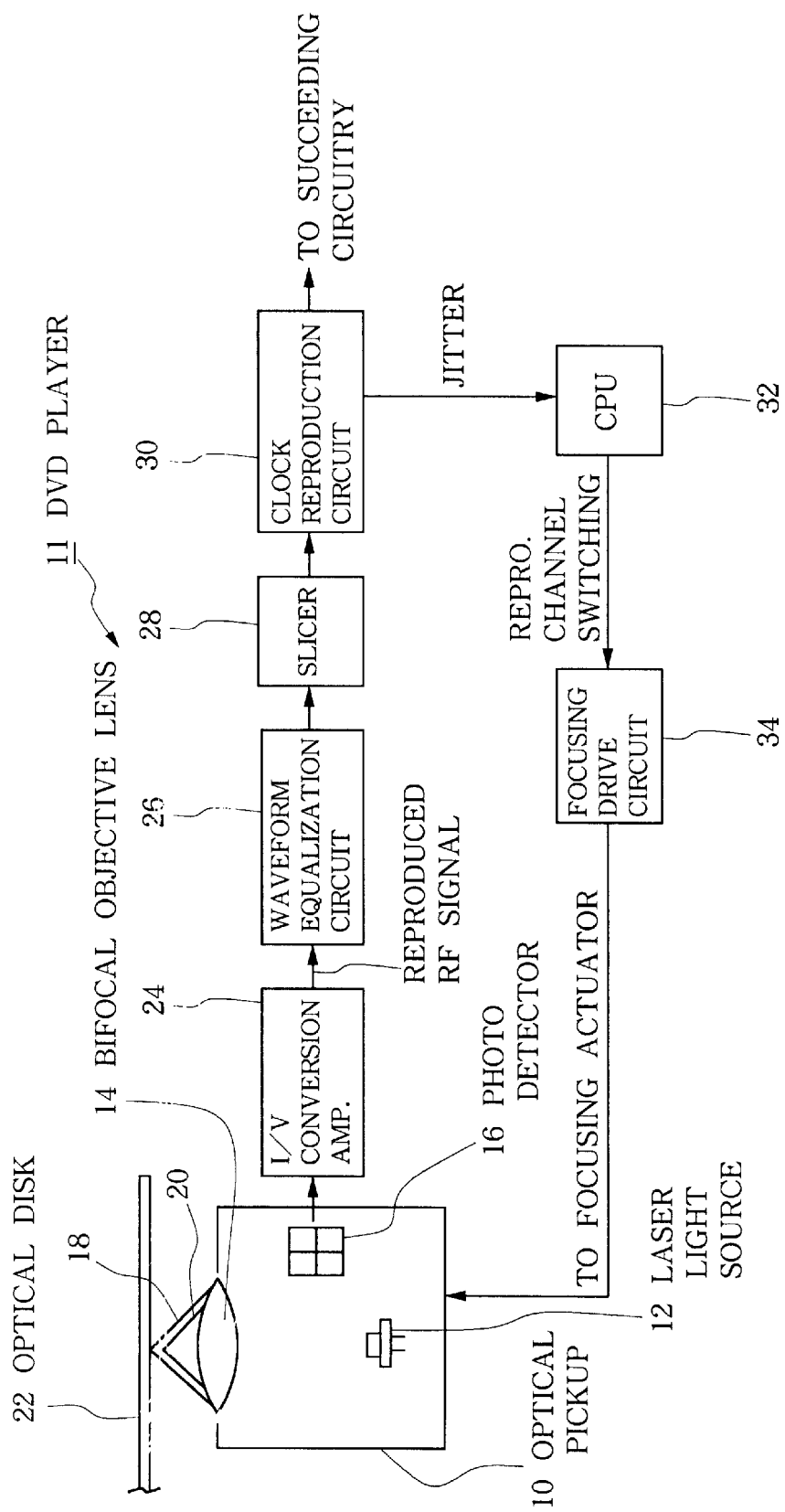
FIG. 2 is a block diagram showing a general setup of a DVD player in accordance with a first embodiment of the present invention, which includes a bifocal optical pickup.

FIG. 2 is a block diagram showing a general setup of a DVD player 11 in accordance with an embodiment of the present invention, which includes a bifocal optical pickup 10. The optical pickup 10 in this embodiment includes a laser light source 12, such as a laser diode, for emitting a laser light beam having a wavelength of 635 nm or 650 nm, a bifocal objective lens 14 such as a hologram-integrated non-spherical lens, a photo detector 16 such as a four-region (four-quadrant) PIN diode, and the like. The laser light beam emitted from the laser light source 12 is split, via the bifocal objective lens 14, into a CD-reproducing beam 18 having a relatively long focal length and a DVD-reproducing beam 20 having a shorter focal length, and the thus-split CD-reproducing beam 18 and DVD-reproducing beam 20 are irradiated onto an optical disk 22. Control is performed in the embodiment such that if the optical disk 22 is a CD, the CD-reproducing beam 18 is appropriately focused on the CD's recording layer, but if the optical disk 22 is a DVD, the DVD-reproducing beam 20 is appropriately focused on the DVD's recording layer. Further, if the optical disk 22 is a high-density CD, control is performed such that one of the CD-reproducing beam 18 and DVD-reproducing beam 20 which attains better jitter characteristics of reproduced RF signals is focused on the disk's recording layer, as will be later described in greater detail.

Reflection of one of the CD-reproducing beam 18 and DVD-reproducing beam 20, having been appropriately focused on the recording layer of the optical disk 22, forms a beam spot on the photo detector 16, which is received by the photo detector 16. Output electric current from the photo detector 16, corresponding to the total light amount received by all of the four light-receiving regions of the detector 16, is given to a current-to-voltage (I/V) conversion amplifier 24 for conversion into a signal indicative of a voltage value corresponding to the input current value (i.e., reproduced RF signal). After that, the reproduced RF signal is delivered to a waveform equalization circuit 26, such as in the form of a transversal filter, for signal level adjustment of each individual pit length, and then it is converted into a binary value or binarized by being sliced via a slicer 28 using an appropriate slicing level. The thus-binarized signal is then passed to succeeding circuitry for signal reproduction processing. Clock reproduction circuit 30 reproduces clock pulse signals from the binarized signal, and compares the phases of each reproduced clock pulse signal and the corresponding output signal from the slicer 28 to thereby output a jitter detection signal corresponding to jitters contained in the reproduced RF signal. CPU 32 performs control to switch between the DVD and CD reproduction channels in accordance with the type (DVD, CD or high-density CD) of the optical disk 22 and detected jitter value. Specifically, the switching between the DVD and CD reproduction channels is performed by controlling a focusing drive circuit 34. More specifically, when the CD reproduction channel is to be used, focusing servo control is performed to focus the CD-reproducing beam 18 on the recording layer of the optical disk 22 by raising the bifocal objective lens 14 from its lower limit position as appropriate. When the DVD reproduction channel is to be used, focusing servo control is performed to focus the DVD-reproducing beam 20 on the recording layer of the optical disk 22 by lowering the bifocal objective lens 14 from its upper limit position as appropriate.

Figure 3:
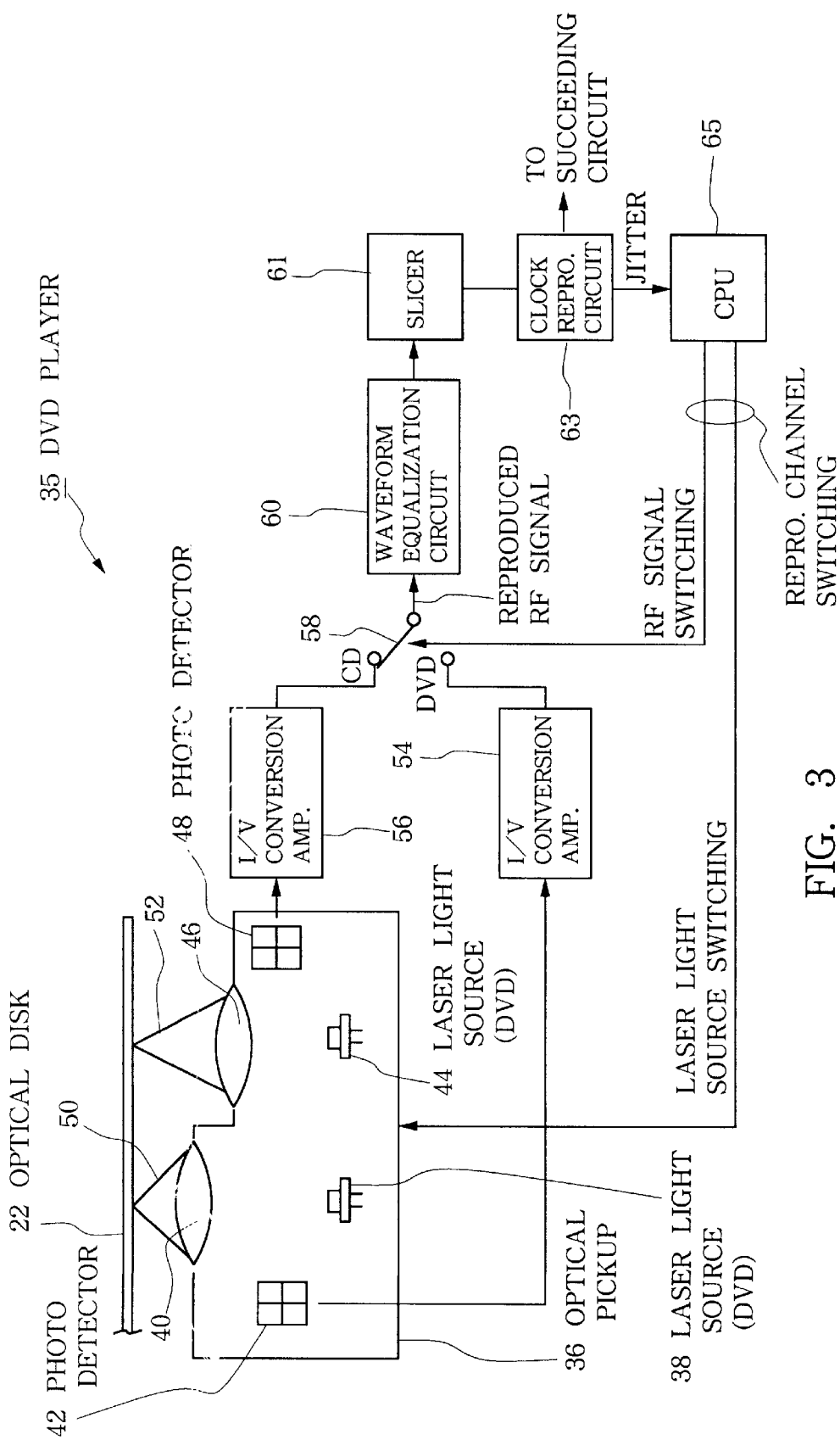
FIG. 3 is a block diagram showing a general setup of a DVD player in accordance with a second embodiment of the present invention, which includes a dual-laser optical pickup.

FIG. 3 is a block diagram showing a general setup of a DVD player 35 in accordance with another embodiment of the present invention, which includes a dual-laser optical pickup 36 in place of the bifocal optical pickup. The dual-laser optical pickup 36 comprises a DVD reproduction processing channel and a CD reproduction channel. The DVD reproduction channel includes a DVD-reproducing laser light source 38, such as a laser diode, for emitting a laser light beam having a wavelength of 635 nm or 650 nm, an objective lens 40, a photo detector 42 such as a four-region (four-quadrant) PIN diode, and the like. The CD reproduction channel includes a CD-reproducing laser light source 44, such as a laser diode, for emitting a laser light beam having a wavelength of 780 nm, an objective lens 46, a photo detector 48 such as a four-region (four-quadrant) PIN diode, and the like. Laser light beam 50 emitted from the DVD-reproducing laser light source 38 is focused via the objective lens 40 on the recording layer of the optical disk 22, and a reflection of the light beam 50 is received by the photo detector 42. Similarly, a laser light beam 52 emitted from the CD-reproducing laser light source 44 is focused via the objective lens 46 on the recording layer of the optical disk 22, and a reflection of the light beam 52 is received by the photo detector 48.

Output electric current from each of the photo detectors 42 and 48, corresponding to the total light amount received by all of the four light-receiving regions of the corresponding detector 42 or 48, is given to a corresponding current-to-voltage (I/V) conversion amplifier 54 or 56 for conversion into a signal indicative of a voltage value corresponding to the input current value (i.e., reproduced RF signal). After that, each of the reproduced RF signals from the current-to-voltage (I/V) conversion amplifiers 54 and 56 is delivered via a switch element 58 to a waveform equalization circuit 60, such as in the form of a transversal filter, for signal level adjustment of each individual pit length, and then it is converted into a binary value by being sliced via a slicer 61 using an appropriate slicing level. The thus-binarized signal is then passed to succeeding circuitry for signal reproduction processing. Clock reproduction circuit 63 reproduces clock pulse signals from the binarized signal, and compares the phases of each reproduced clock pulse signal and the corresponding output signal from the slicer 61 to thereby output a jitter detection signal corresponding to jitters contained in the reproduced RF signal. CPU 65 performs control to switch between the DVD and CD reproduction channels in accordance with the type (DVD, CD or high-density CD) of the optical disk 22 and detected jitter value. Specifically, the switching between the DVD and CD reproduction channels is effected by switching between the laser light sources 38 and 44 and between the contacts of the switch element 58. Namely, the DVD reproduction channel can be placed in usable condition by turning on the DVD-reproducing laser light sources 38, turning off the CD-reproducing laser light source 44, causing the switch element 58 to be connected to the DVD current-to-voltage (I/V) conversion amplifier 54 and focusing the DVD-reproducing laser light beam 50. Similarly, the CD reproduction channel can be placed in usable condition by turning on the CD-reproducing laser light sources 44, turning off the DVD-reproducing laser light source 38, causing the switch element 58 to be connected to the CD current-to-voltage (I/V) conversion amplifier 56 and focusing the CD-reproducing laser light beam 52.

Figure 1:
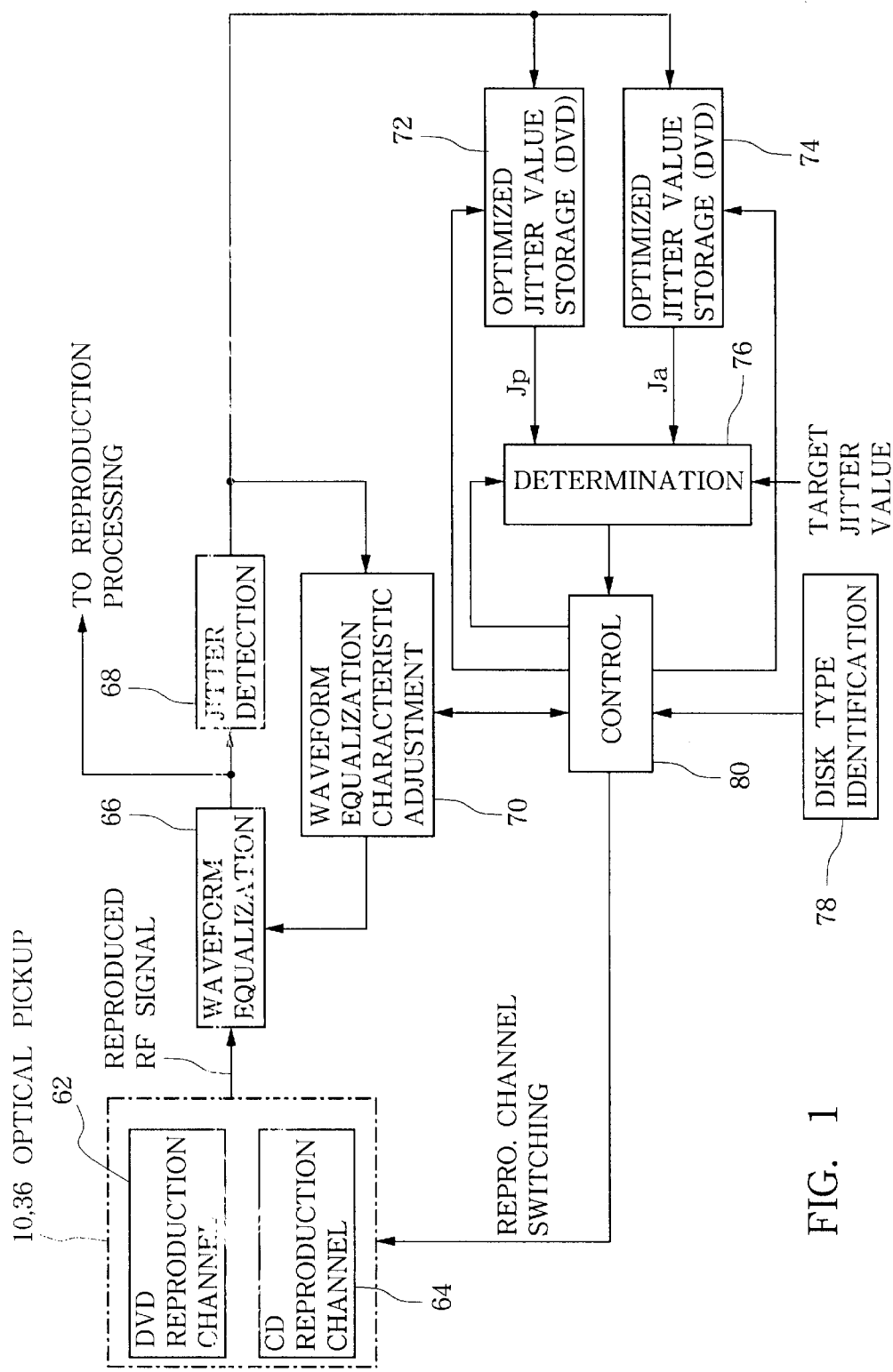
FIG. 1 is a functional block diagram showing how switching between DVD and CD reproduction channels is controlled in the present invention.

FIG. 1 is a functional block diagram showing how switching between DVD and CD reproduction channels is controlled in the DVD players 11 and 35 having been described above in relation to FIGS. 2 and 3. Reproduced RF signal output from a DVD or CD reproduction channel 62 or 64 of the optical pickup 10, 36 is subjected to a waveform equalization process by a waveform equalization section 66, and then jitters of the RF signal are detected by a jitter detection section 68. Waveform-equalization-characteristic adjustment section 70 automatically adjusts waveform equalization characteristics of the waveform equalization section 66 in order to optimize the detected jitter value (i.e., in order to allow the detected jitter value to be closest to a predetermined target jitter value, e.g. zero jitter value). Optimized jitter value storage section 72 stores a jitter value Jb optimized using the DVD reproduction channel 62 in a test reproduction process that is directed to determining a reproduction channel to be used for playback of a high-density CD. Optimized jitter value storage section 74 stores a jitter value Ja optimized using the CD reproduction channel 64 in the same test reproduction process. Determination section 76 makes a comparison between each of the optimized jitter values for the DVD and CD reproduction channels stored in the storage sections 72, 74 and the predetermined target jitter value, and determines which of the DVD and CD reproduction channels attains the optimized jitter value closer to the predetermined target jitter value. Disk type identification section 78 identifies the type (DVD, CD or high-density CD) of the optical disk set in the DVD player for reproduction. Further, a control section 80 controls the switching between the DVD and CD reproduction channels 62 and 64, on the basis of the identified disk type and determined result of the determination section 76.

Figure 4:
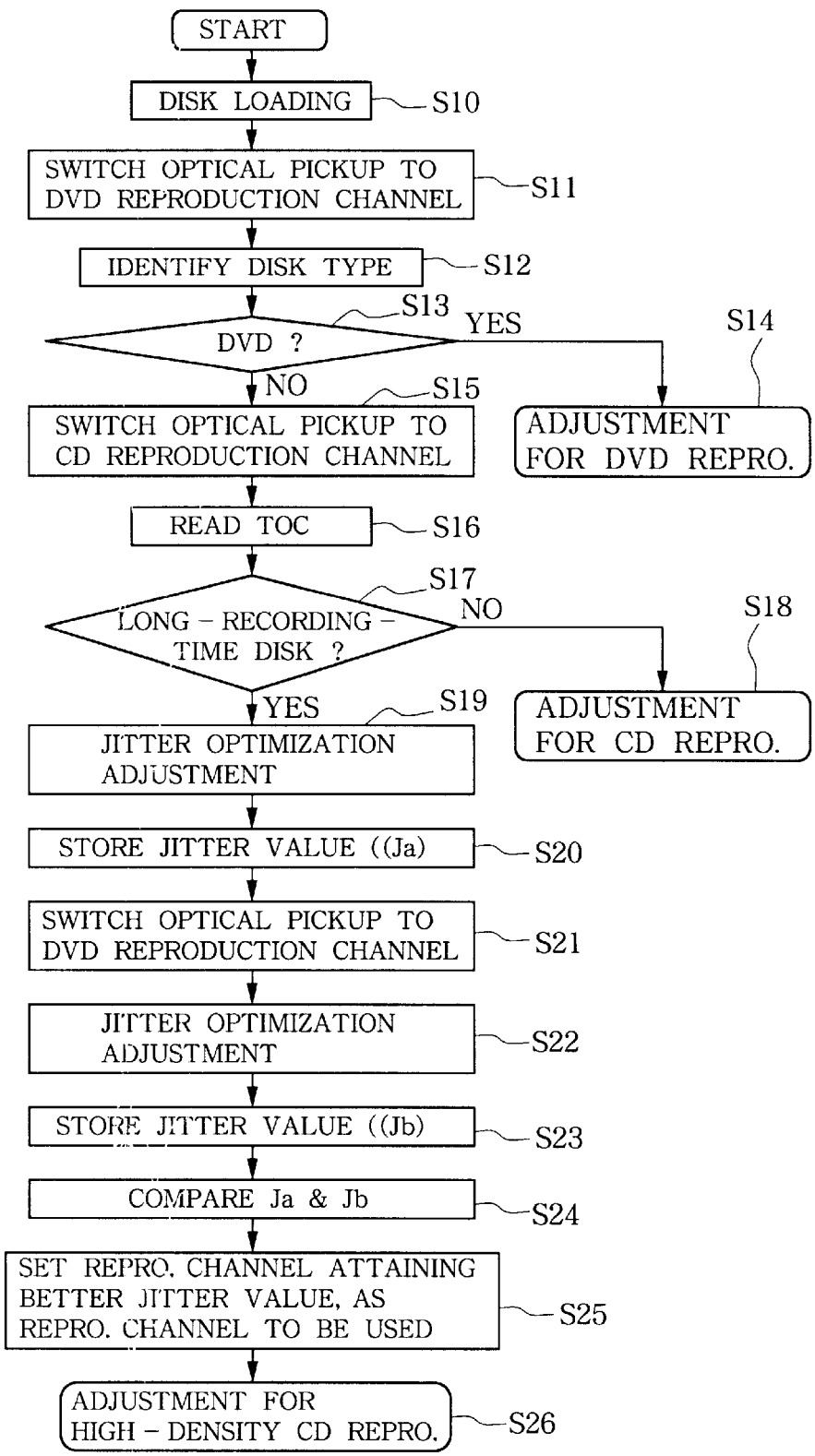
FIG. 4 is a flow chart showing an exemplary operational sequence followed in controlling the switching between the DVD and CD reproduction channels.

FIG. 4 is a flow chart showing an exemplary operational sequence followed in controlling the switching between the DVD and CD reproduction channels 62 and 64. Once a n optical disk is set or loaded into the DVD player, the optical pickup 10, 36 is switched to the DVD reproduction channel 62 at step S11, and the type of the loaded optical disk is identified at steps S12 and S13 in the following manner. Namely, the objective lens 14 (FIG. 2) or 40 (FIG. 3) is moved from the predetermined lower limit position to the predetermined upper limit position at a predetermined speed with the focusing servo turned off. During the upward movement of the objective lens, the number of times the reproducing laser light beam is brought into focus is counted on the basis of focus error signals and simultaneously a measure is made of a time length from the start of the upward movement to a time point when the laser light beam is brought into focus (hereinafter called a "focusing time"). If the reproducing laser light beam is brought into focus twice, the optical disk is identified as a dual-layered DVD. If the reproducing laser light is brought into focus only once and if the focusing time is shorter than a predetermined reference time, the optical disk is identified as be a single-layered DVD; in this case, the reproducing laser light can be brought into focus in a shorter time because the substrate thickness is as small as 0.6 mm. Further, if the reproducing laser light is brought into focus only once and if the focusing time is longer than the predetermined reference time, the optical disk is identified as a CD or high-density CD; in this case, it takes a longer time for the reproducing laser light to be brought into because the substrate thickness is as great as 1.2 mm. In this way, the DVD and CD (or high-density CD) can be distinguished from each other.

When the optical disk has been identified as a DVD, the optical disk is subjected to formal reproduction (as distinguished from the test reproduction) after completion of various adjustment necessary for the DVD reproduction including focusing adjustment by the DVD reproduction channel 62 and waveform equalization at step S14. When the optical disk has been identified as a CD or high-density CD, the optical pickup 10, 36 is switched to the CD reproduction channel 64 at step S15, and the reproducing laser light beam is brought into focus to read the TOC in the disk's lead-in area at step S16. Then, at step S17, a determination is made, on the basis of the TOC, as to whether or not the total program-recording time length of the optical disk is shorter than 100 min. If the total program-recording time length of the optical disk is shorter than 100 min. as determined at step S17, the optical disk is identified as a CD, so that the optical disk is subjected to formal reproduction using the CD reproduction channel 64, after completion of various adjustment necessary for the CD reproduction including waveform equalization at step S18. If, on the other hand, the total program-recording time length of the optical disk is 100 min. or over as determined at step S17, the optical disk is identified as a high-density CD, and jitter-optimizing adjustment is performed at step S19 for finding waveform equalization characteristics attaining a jitter value closest to the target jitter value, by directly using the CD reproduction channel 64 and variously changing, via the waveform-equalization-characteristic adjustment section 70, the waveform equalization characteristics of the waveform equalization section 66 at a predetermined radial position (e.g., the data area located close to the inner edge) of the optical disk. Then, the jitter value Ja optimized through the jitter-optimizing adjustment of step S19 is stored at step S20. After that, the optical pickup 10, 36 is switched to the DVD reproduction channel 62 at step S21, and, similarly. to the above-mentioned, jitter-optimizing adjustment is performed at step S22 for finding waveform equalization characteristics attaining a jitter value closest to the target jitter value, by variously changing, via the waveform-equalization-characteristic adjustment section 70, the waveform equalization characteristics of the waveform equalization section 66 at a predetermined radial position (e.g., the data area located close to the inner edge) of the optical disk. Then, the jitter value Jb optimized through the jitter-optimizing adjustment of step S22 is stored at step S23. Then, at step S24, by comparing the optimized jitter values Ja and Jb of the DVD and CD reproduction channels 62 and 64, it is determined which of the reproduction channels 62 and 64 attains the better jitter value (closer to the target jitter value), and one of the reproduction channels which has been determined as attaining the better jitter value is set as the reproduction channel to be used for the optical disk at step S25. Then, using the thus-set reproduction channel, the waveform equalization characteristics of the waveform equalization section 66 are set in accordance with the optimized jitter value Ja or Jb attained for the set reproduction channel. Then, formal reproduction is performed of the optical disk after other necessary adjustment is made for the high-density CD reproduction at step S26.

It should be appreciated that whereas the preferred embodiments have been described above as automatically identifying the disk type, information representative of the disk type may be entered through a user's operation. Further, although the preferred embodiments have been described above as applied to the case where a high-density CD is reproduced via the optical pickup provided with the CD and DVD reproduction channels, the present invention may be applied to other combinations of optical disks and reproduction channels.

What is claimed is:

1. An optical disk reproducing method comprising:

a step of providing an optical pickup including a first reproduction channel for reproducing a first-type optical disk and a second reproduction channel for reproducing a second-type optical disk; and a step of, when reproduction is to be performed on a third-type optical disk that is different from said first-type optical disk and said second-type optical disk but reproducible via each of said first reproduction channel and said second reproduction channel, first test-reproducing said third-type optical disk both via said first reproduction channel and via said second reproduction channel to thereby detect a jitter value of the information reproduced via said first reproduction channel and a jitter value of the information reproduced via said second reproduction channel, and then reproducing said third-type optical disk using one of said first reproduction channel and said second reproduction channel that attains the jitter value closer to a predetermined target jitter value.

2. An optical disk reproducing method as claimed in claim 1 wherein said first-type optical disk is a DVD, said second-type optical disk is a normal CD, said first reproduction channel is a DVD reproduction channel and said second reproduction channel is a CD reproduction channel, and wherein said third-type optical disk is a high-density CD of a CD recording format which has a higher recording density than a recording density of the normal CD so as to provide a total program-recording time length of 100 min. or over.

3. An optical disk reproducing apparatus comprising:

an optical pickup including a first reproduction channel for reproducing a first-type optical disk and a second reproduction channel for reproducing a second-type optical disk;

a jitter detection section that detects a jitter value of a reproduced RF signal outputted by said first reproduction channel and a jitter value of a reproduced RF signal outputted by said second reproduction channel; and a control section that switches between said first reproduction channel and said second reproduction channel, depending on a type of the optical disk to be reproduced and jitter values, in such a manner that said first reproduction channel is used when reproduction is to be performed on said first-type optical disk and said second reproduction channel is used when reproduction is to be performed on said second-type optical disk and also that when reproduction is performed on a third-type optical disk that is different from said first-type optical disk and said second-type optical disk but reproducible via each of said first reproduction channel and said second reproduction channel, said third-type optical disk is first test-reproduced from both via said first reproduction channel and via said second reproduction channel to thereby detect a jitter value of the information reproduced via said first reproduction channel and a jitter value of the information reproduced via said second reproduction channel and then said third-type optical disk is reproduced using one of said first reproduction channel and said second reproduction channel that attains the jitter value closer to a predetermined target jitter value.

4. An optical disk reproducing apparatus as claimed in claim 3 which further comprises:

a waveform equalization section that performs a waveform equalization process on the reproduced RF signals;

a waveform-equalization-characteristic adjustment section that adjusts a waveform equalization characteristic of said waveform equalization section, so as to optimize the jitter values detected by said jitter detection section for the reproduced RF signals having been subjected to the waveform equalization process; and a determination section that, when reproduction is to be performed on said third-type optical disk, compares the jitter value of said third-type optical disk test-reproduced using said first reproduction channel and optimized via said waveform-equalization-characteristic adjustment section and the jitter value of said third-type optical disk test-reproduced using said second reproduction channel and optimized via said waveform-equalization-characteristic adjustment section and makes a determination as to which of said first reproduction channel and said second reproduction channel attains the jitter value closer to the predetermined target jitter value, and wherein said control section switches the reproduction channel to be used for reproduction of said third-type optical disk, on the basis of a result of said determination.

5. An optical disk reproducing apparatus as claimed in claim 3 which further comprises a disk type identification section that identifies a type of the optical disk having been set in said optical disk reproducing apparatus, and wherein said control section controls switching of the reproduction channel to be used for reproduction of said third-type optical disk on the basis of the type of the optical disk identified by said disk type identification section.

6. An optical disk reproducing apparatus as claimed in claim 3 wherein said first-type optical disk is a DVD, said second-type optical disk is a normal CD, said first reproduction channel is a DVD reproduction channel and said second reproduction channel is a CD reproduction channel, and wherein said third-type optical disk is a high-density CD of a CD recording format which has a higher recording density than a recording density of the normal CD so as to provide a total program-recording time length of 100 min. or over.

7. An optical disk reproducing apparatus as claimed in claim 6 wherein said disk type identification section identifies the optical disk as a normal CD when the total program-recording time length represented by Q subcode information in a lead-in area of the optical disk is less than 100 min., but identifies the optical disk as a high-density CD when the total program-recording time length represented by the Q subcode information in the lead-in area of the optical disk is 100 min. or over.

* * * * *